United States Patent [19]

Ruhl

[11] 4,009,615
[45] Mar. 1, 1977

[54] SELF CONTAINED ELECTRONIC DIGITAL THERMOMETER

[76] Inventor: George A. Ruhl, 95 Hartley Ave., Mt. Vernon, N.Y. 10550

[22] Filed: Dec. 23, 1975

[21] Appl. No.: 643,677

[52] U.S. Cl. .......................................... 73/362 AR
[51] Int. Cl.² .......................................... G01K 3/00
[58] Field of Search .......... 73/342, 362 AR, 362 R; 340/228 R

[56] References Cited

UNITED STATES PATENTS

| | | | |
|---|---|---|---|
| 3,350,943 | 11/1967 | Smith | 73/362 AR |
| 3,494,196 | 2/1970 | Moussette | 73/362 AR |
| 3,785,207 | 1/1974 | Brzezinski | 73/362 AR |
| 3,872,726 | 3/1975 | Kauffeld et al. | 73/362 AR |
| 3,880,006 | 4/1975 | Poduje | 73/362 AR |
| 3,905,232 | 9/1975 | Knute | 73/362 AR |

Primary Examiner—Jerry W. Myracle
Attorney, Agent, or Firm—Jack D. Slobod

[57] ABSTRACT

A self-contained electronic digital thermometer is in the form of an elongated probe has a temperature transducing thermistor at a front end and an electronic digital display at a rear end. Circuitry housed within the probe converts the voltage across the thermistor to a digital signal for driving the display. The circuitry includes an operational amplifier fed by the thermistor voltage via a pair of selectable input resistors for providing different gains for the amplifier and fed by a voltage source via a different pair of selectable input resistors for providing different biases to the amplifier. The different gains and biases are selected by a switch for enabling readout in either degree Fahrenheit or degrees Centigrade. A differentiator and comparators are also provided to drive a series of lights indicative of whether the temperature is increasing, decreasing or stable.

1 Claim, 2 Drawing Figures

SELF CONTAINED ELECTRONIC DIGITAL THERMOMETER

FIELD OF THE INVENTION

The present invention relates generally to electronic digital thermometers. In its particular aspects, the present invention relates to an electric digital thermometer self contained in a probe element which thermometer is configured for selective readout in either degrees Fahrenheit or degrees Centigrade.

BACKGROUND OF THE INVENTION

Electronic digital thermometers which have heretofore been proposed included a probe element connected by a cable to a separate display chassis. Such devices have been cumbersome to use in practice and have had other disadvantages due to their provision for digital readout on only a single temperature scale. Further, it has been difficult to determine in such devices when a particular temperature reading could be considered stabilized.

OBJECTS OF THE INVENTION

It is an object of the present invention to provide an electronic digital thermometer self contained in a probe element.

It is a further object of the present invention to provide an electronic digital thermometer which includes a switch for selecting readout in either degrees Fahrenheit or degrees Centigrade.

It is yet another object of the present invention to provide an electronic digital thermometer which includes a display indicative of whether the temperature reading is increasing, decreasing or has stabilized.

SUMMARY OF THE INVENTION

Briefly, the aforementioned and other objects of the present invention are satisfied by providing an electronic digital thermometer self-contained in an elongated probe carrying a temperature transducer at its front end and an electronic digital display at its rear end. Circuit means housed within the prove converts the analog output signal from the transducer to a digital signal for driving the display.

The circuit means includes an amplifier fed by the transducer which has selectable gain and bias parameters controlled by a switch mounted at the rear of the probe. The switch selects gain and bias parameters for enabling the display to read in either degrees Fahrenheit or degrees Centigrade.

A series of three indicator lamps are provided on the rear of the probe for respectively indicating whether the temperature reading is increasing, decreasing or has stabilized. A differentiator is fed by the amplifier to form an output voltage indicative of the rate of change of the temperature reading. This output voltage feeds a comparator means having three outputs for respectively driving the lamps. The outputs are respectively energized if the output voltage is greater than a predetermined positive constant, less than the negative of the constant, and between the constant and its negative.

Other objects, features and advantages of the present invention will become upon perusal of the following detailed description of the preferred embodiment thereof when taken in conjunction with the appended drawing wherein.

DETAILED DESCRIPTION

Figure 1:
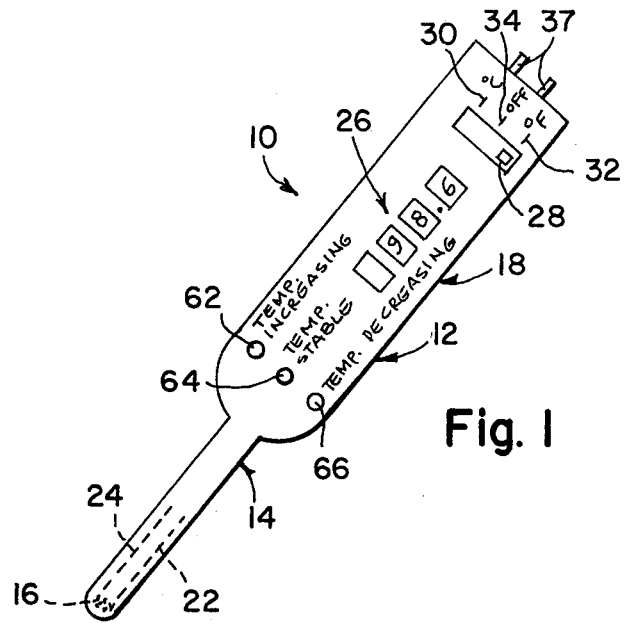
FIG. 1 is a side view of the digital thermometer of the present invention.
Figure 2:
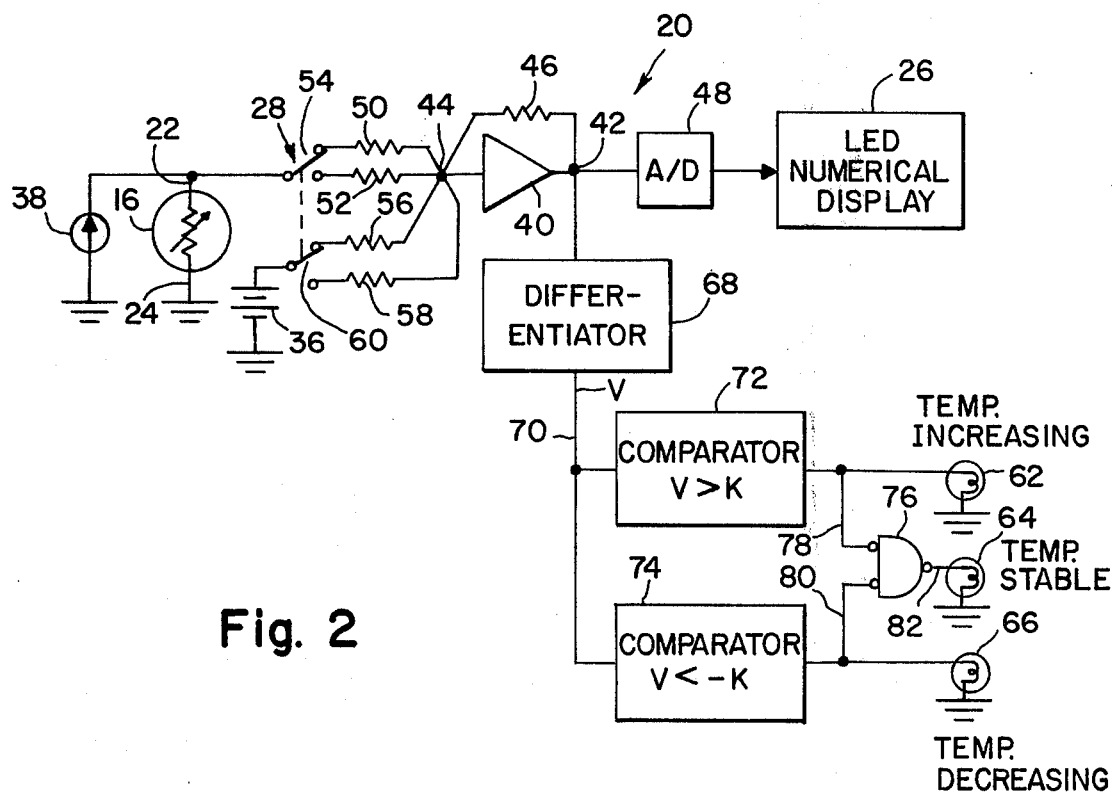
FIG. 2 is an electrical schematic for the thermometer in FIG. 1.

Referring to FIGS. 1 and 2 of the drawing, the electronic digital thermometer of the present invention is generally indicated by the reference numeral 10. The thermometer 10 is self-contained in an elongated probe 12 having an elongated tubular shaft 14 forming the front end of the probe. Shaft 14 has a thermistor 16 housed at its tip. A cylindrical portion 18 of greater diameter than shaft 14 is coaxial with the shaft and forms the rear end of probe 12. The portion 18 is of increased diameter relative to shaft 14 so that it may house all the circuitry 20 indicated schematically in FIG. 2 except the thermistor 16 which is interconnected with the remainder of circuitry 20 by a pair of leads 22 and 24 running axially through shaft 14.

Portion 18 carries a digital light emitting diode four digit numerical display 26 three digits for degrees, and one digit for tenths of degrees. A switch 28 is also mounted on portion 18. Switch 28 has two opposite extreme positions 30 and 32 respectively for selecting readout display 26 for either degrees Centigrade or degrees Fahrenheit. In addition, a center position 34 is provided for switch 28 for disconnecting the battery 36 with probe 12 from the remainder of circuitry 20. Further a connector jack 37 may be provided on the back end of probe 12 to enable charging battery 36.

The switch 28 is illustrated in FIG. 2 as being of the double pole double throw type for ease of understanding. This aspect deals soley with the selection of degrees Fahrenheit or Centigrade. The center off function of switch 28 does not form a part of the present invention and is easily mechanized for example by making switch 28 triple pole double throw to provide an additional contact set to connect the battery 36 in circuitry 20 only at the two extreme positions of switch 28.

The thermistor 16 is fed by a current source 38 derived from battery 36 in a conventional manner. An operational amplifier 40 having an output terminal 42, an input summing node 44 and a feedback resistor 46 is utilized to amplify the voltage across thermistor 16 to provide a properly scaled or conditioned output voltage at its output terminal 42. This output voltage feeds an analog to digital converter 48 which in turn drives display 26.

For deriving a properly scaled voltage at terminal 42 indicative of the numbers to be displayed, it is necessary to suitably select the voltage gain and voltage offset or bias associated with amplifier 40 for degrees Centigrade and degrees Fahrenheit readout. The gain parameter is adjusted by selectively coupling the output from thermistor 16 to summing node 44 via either of two different resistors 50 and 52 which are in the ratio of 8 to 5 utilizing one pole 54 of switch 28. The offset or bias parameter is adjusted by selectively coupling battery 36 to summing node 44 via either of two different resistors 56 and 58 utilizing the other pole 60 of switch 28. It should be appreciated that the gain and offset parameter associated with amplifier 40 are easily selected for appropriate values at the two extremes of switch 28 for the voltage at amplifier output terminal 42 to be conditioned, for example, to equal the desired numerical reading when expressed in tens of millivolts.

Thus, the converter 48 and display 26 may operate in effect as a digital voltmeter to display the proper numerical value.

For indicating whether the temperature reading on display 26 is increasing, may be considered stable, or is decreasing, a series of three lamps 62, 64 and 66 are respectively provided on portion 18. The lamps 62–66 are respectively illuminated to indicate the occurrence of the condition they represent. To accomplish this, the output terminal 42 of amplifier 40 feeds a differentiator 68 of the inverting type. The output voltage, V, of differentiator 68 on line 70 is fed to the inputs of two comparators 72 and 74 which respectively drive lamps 62 and 66.

Comparator 72 is configured to compare V with a suitable small positive constant voltage and to produce an output signal for energizing lamp 62 only when V is greater than K. Comparator 74 is configured to compare V with a the negative of K and to energize lamp 66 when V is less than —K. Further the outputs of comparators 72 and 74 respectively feed the two inputs of a NANO gate 76 via leads 78 and 80. The output 82 of gate 76 is coupled for driving lamp 64 when neither of lamps 62 and 66 are energized by their associated comparators. This signals that V is between —K and K and consequently the temperature reading may be considered as stabilized.

While the preferred embodiment of the present invention has been described in specific detail it should be understood that numerous modifications, additions and omissions in the details thereof are possible within the intended spirit and scope of the invention claimed herein.

What is claimed is:

1. A digital thermometer device comprising: an elongated probe carrying a temperature electrical transducer means at its front end and a first electrical digital display means at its rear end; said transducer means having an analog output; switch means mounted on the rear end of said probe for selecting readout of said first display means in either degrees Fahrenheit or degrees Centigrade; and circuit means housed within said probe for converting the analog output of said transducer means to a digital signal for driving said first display means; said circuit means including amplifier means fed by said analog output; said amplifier means having first and second sets of gain and bias parameters selectable by said switch means; second electrical display means on the rear end of said probe for indicating whether the analog output of said transducer is increasing, decreasing or is substantially stable; a differentiator means fed by said amplifier means and feeding said display means; said comparator means having three output signals for feeding said second display means, a first output indicative of whether the output of said differentiator means is greater than a predetermined positive constant; a second output indicative of whether said differentiator output is less than the negative of said constant; and a third output indicative of whether said differentiator output is between said positive constant and the negative of said constant.

* * * * *